Jan. 13, 1959     O. A. NESS ET AL     2,869,052
MOLDED CAPACITORS
Filed March 1, 1954
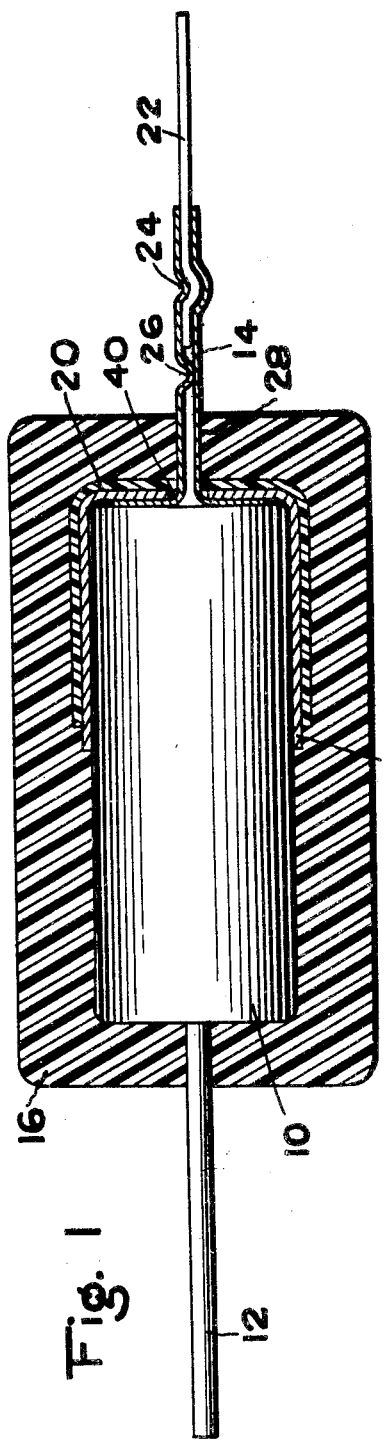
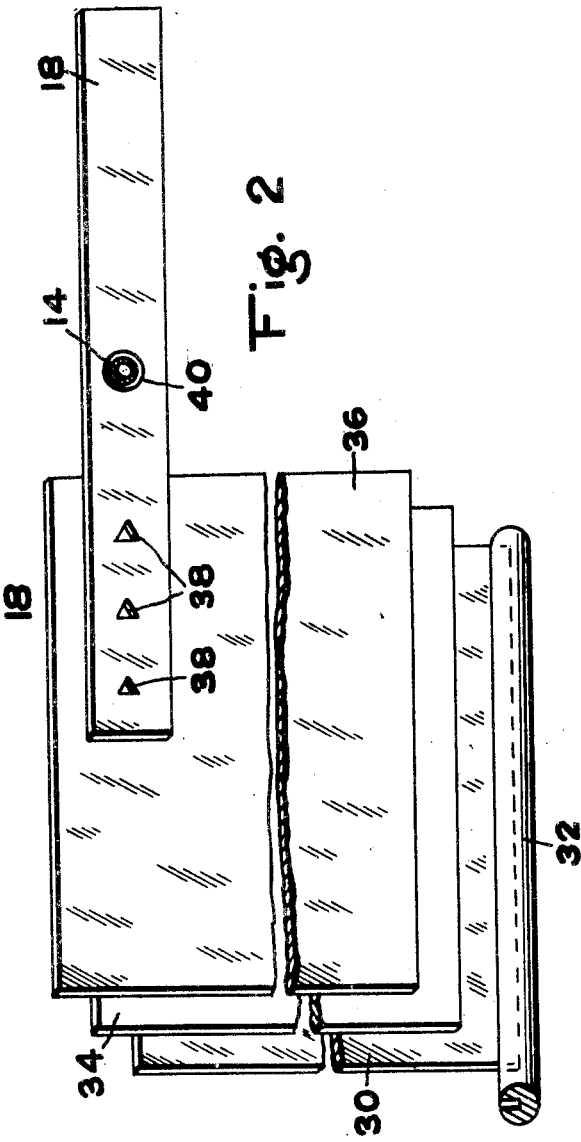
INVENTORS
ODVAR A. NESS and
KERMIT N. LAMBERT
BY
THEIR ATTORNEYS

United States Patent Office 2,869,052
Patented Jan. 13, 1959

2,869,052

MOLDED CAPACITORS

Odvar A. Ness and Kermit N. Lambert, Williamstown, Mass., assignors to Sprague Electric Company, North Adams, Mass., a corporation of Massachusetts Application March 1, 1954, Serial No. 413,150

6 Claims. (Cl. 317—230)

This invention relates to molded impregnated capacitors and more particularly to molded electrolytic capacitors having a unique terminal arrangement provided for impregnation after molding.

This invention follows as an improvement of the molded electrolytic capacitor of the Brafman Patent No. 2,628,271 and also as an improvement of the molded tubular dielectric impregnated capacitors described and claimed in the Robinson et al. pending application, Serial No. 175,222, filed July 21, 1950, now U. S. Patent No. 2,682,626, granted June 29, 1954. Both the Brafman and Robinson et al. specifications are concerned with a molded capacitor in which an eyelet is made available for impregnation of the device after encapsulation in molded resin, the eyelet being soldered to the extended foil of the capacitor section. The solder bond of the capacitor section to the eyelet in the above disclosed structures is often times a source of electrical discontinuities in the finished structure. The capacitor of Brafman suffers from the further disadvantage that the soldered connection of the exterior lead wire to the eyelet allows the corrosive action of the enclosed electrolyte to be directed against the external lead wire and its soldered bond which materially affects the life of the units.

An object of this invention is to overcome the foregoing and related disadvantages. A further object is to produce a terminal assembly which is susceptible to use as an impregnating channel for impregnated electrical assemblies and can be mechanically sealed so as to prevent egress of the impregnant over extended periods of time. A further object of this invention is to produce an electrical capacitor which is fully encased in a resinous coating and susceptible to impregnation after encasement through a novel terminal assembly. Other objects of this invention will become apparent from the following specification and appended claims.

These objects are attained in accordance with the present invention wherein there is produced a terminal for an impregnated electrical assembly comprising a lead wire positioned within and extending outwardly from a tubular element, said lead wire being compressionally welded to said element so as to prevent the egress of said impregnant.

In a more restricted sense, the invention is concerned with a capacitor comprising an impregnated capacitor section having at least two electrode leads, said section being substantially fully encased in a layer of resinous material, one of said leads having a tubular rivet mechanically and electrically bonded thereto, said rivet being extended through and partially embedded in said resinous material and an external lead wire compressionally welded to the interior surface of said tubular rivet.

In a still more restricted sense the invention is concerned with an electrolytic capacitor comprising an aluminum electrolytic capacitor section, said section being wound about an anode lead wire which extends outwardly from said wound section, said capacitor section having a tab stitched to the cathode electrode, said tab having a tubular rivet mechanically and electrically connected thereto, said electrolytic capacitor section being substantially fully encased in a molded resinous shell, an electrolyte impregnated into said capacitor section and retained within said resinous shell, said rivet extending through said resinous layer and compressionally bonded to an exterior lead wire, and said rivet being fully collapsed between said electrolyte and said exterior lead wire so as to prevent corrosion of the latter by the encased electrolyte.

This invention is featured by the use of solderless connections for the various elements which is particularly important for electrolytic applications as the presence of dissimilar metals arising out of soldered connections in the electrolyte is susceptible to active corrosion with deleterious effects resulting therefrom. Aside from the effect of the electrolyte medium upon the soldered connections, bondings of the aluminum with solder are notoriously weak and if not featured by actual breaks are in many cases points of substantially increased resistance, thus lowering the quality of the capacitor.

According to this invention we have found it possible to produce molded electrostatic and electrolytic capacitors susceptible to impregnation after molding and featured by solderless connections throughout the assembly and a compressional connection of the outside lead wire within the impregnation channel in such a manner that egress of the impregnant is avoided. The preferred structure is a molded electrolytic capacitor inexpensive to produce and which exhibits much improved electrical characteristics. Our invention, outside the scope of its preferred form, has applicability to sealed impregnated electrical devices and is of substantial import for molded electrostatic devices.

In accordance with this invention we can produce molded electrostatic and electrolytic capacitors susceptible to impregnation after molding and featured by solderless connections throughout the entire assembly. These units are produced in a rapid and inexpensive manner, and have excellent electrical properties which can be maintained over extended periods of operation. The novel terminal that forms a portion of the invention is mechanically bonded to the external lead wire in a manner which prevents egress of the impregnant confined within the molded casing and for electrolytic capacitors is further mechanically closed so as to avoid electrolyte contact with the non-valve metal used as the external lead wire. Our preferred structure is a low voltage non-vented molded electrolytic capacitor which, in addition to the feature of solderless connections, has only a valve metal in contact with the contained electrolyte.

For better understanding of our invention reference is made to the attached drawings in which:

Fig. 1 shows a cross-sectional view of a complete molded electrolytic capacitor; and Fig. 2 portrays the electrolytic capacitor section in unwound form.

In Fig. 1 the wound electrolytic section is indicated by 10 and has extending axially in opposed directions the anode lead 12 and the cathode tubular rivet 14 which forms the impregnation channel for the electrolyte after the enclosing of the section 10. The molded casing 16 is formed around the dry section 10 by a molding operation. A cathode tab 18 (see also Fig. 2), secured to the cathode foil, is folded over the end and against the opposite side of the section. The cathode tab 18 has a hole 40 through which the narrow body of the tubular rivet 14 is placed. The wide base of the rivet is thereby maintained in position during molding. To avoid movement of the cathode tab 18 and its associated tubular rivet 14 during the molding cycle and to prevent the molding powder from entering into the region between the end of the capacitor section 10 and the tubular rivet 14, a resin adhesive tape 20 is wound about the periphery of the section 10. After molding, evacuation of the section and subsequent drying as well as subsequent impregnation is effected through the tubular rivet 14. Once impregnation has been completed, an external lead wire 22 is positioned in the end of the tubular rivet 14 and a die is imposed upon the outer surface of the tubular rivet so as to compressionally weld the tubular rivet 14 with the external lead wire 22. It should be noticed that the die applies two depressions 24 and 26 upon the tubular rivet which can be made of aluminum. The first depression 24 mechanically bonds the rivet 14 to the external lead wire 22 while the depression 26 effects a closing of the rivet 14 so as to avoid contact of the electrolyte upon the external lead wire 22. The segment of the rivet 14 which still remains in tubular form is indicated by 28, this being imbedded in the resin 16.

As indicated in the foregoing, our structure features the use of only valve metals within the molded shell when the preferred electrolytic structure is produced. The unwound section which is portrayed in Fig. 2 illustrates a typical formed aluminum electrolytic section. The formed anode 30 is initially mechanically connected to a formed anode riser 32 which serves the dual function of a mandrel during winding of the capacitor section and the lead wire from the anode 30. The end of the anode 30 is placed into the partially slit anode riser 32 which is thereafter compressed to maintain satisfactory electrical and mechanical connection between the anode riser 32 and the anode 30. A paper spacer is indicated by 34 with the unformed cathode designated by 36. The cathode tab 18 is mechanically stitched as indicated at 38 to the end of the cathode foil 36 in a fashion well known to the art (see United States Patent No. 2,020,408). The cathode tab 18 extends beyond the cathode foil 36 and its stitched portions 38, a sufficient distance so as to allow folding over of the tab 18 against the opposite side of the wound section 10. The hole which has been formed in the cathode tab is illustrated with a cross-section of the tubular rivet 14 pictured inside it. After rolling of the section, the rivet 14 is placed in the hole 40 and the tab 18 is thereafter folded around the section 10 and held into place by the resinous adhesive tape 20.

Although it has been indicated from the discussion of the drawings that our preferred structure is a molded aluminum foil electrolytic capacitor, non-vented, our construction is subject to numerous modifications, all of which fall within the present invention. For electrolytic applications the foil metals may be of any valve metal, for example, tantalum, zirconium, columbium, etc. The type and nature of the electrolyte need not be restricted for our invention. For high potential applications in excess of 150 v., the device of our invention must incorporate a venting means which includes the elastomer electrolyte impervious barrier disclosed in the aforementioned Brafman patent, 2,628,271, the low melting wax barrier of the Deeley patent, 2,282,459, as well as other known venting devices and means.

For electrostatic applications the teachings of our invention yield a molded unit featured by sturdy, low resistance connections within the encased assembly, a terminating assembly which provides for impregnation after molding, a mechanical impregnant seal less susceptible to impregnant passage than the soldered type, and a mechanical bonding of the terminal assembly to the lead wire, strong enough to withstand axial forces in excess of fifteen pounds.

For purposes of illustration of the improved characteristics of our units, several hundred polarized aluminum electrolytic capacitor sections, 25 mfd. and 10 mfd., were assembled and molded in accordance with the teachings herein set forth with the following results:

a. The maximum variation in capacity of units was —7.4% and +5.4% from average.

b. Equivalent series resistance of less than 10 ohms.

c. Substantial decrease in the equivalent series resistance and power factor after extended life test.

d. The terminal assembly of a representative sampling of the units withstood axial forces of from sixteen to twenty-nine pounds and had a resistance average of 0.6 milliohm.

The utility of this invention is thus clear for it offers a substantial improvement to dry molded capacitors particularly the electrolytic type. The molded product has unusually small variations in capacitance in pilot production offering much improved quality control. Furthermore, the unit is economical to produce with improved electrical characteristics after extended operational and shelf life.

This latter property is believed primarily due to the absence of soldered connections or non-valve metals in contact with the contained impregnant. As indicated, the presently preferred embodiment is for low voltage applications as it does not include a vent, however, for high voltage applications the requisite vent, similar in structure to any of the well-known means, is compatible with our structure. For molded electrostatic capacitors our structure offers a positive means of avoiding the contamination of and the deleterious effects of soldered aluminum connections upon the impregnant besides yielding a terminal lead structure of exceptional tensile strength and means of effective containment of the impregnant within the casing during shelf and operational life.

As many apparently widely different embodiments of this invention may be made without departing from the spirit and scope hereof, it is to be understood that the invention is not limited to the specific embodiments hereof except as defined in the appended claims.

What is claimed is:

1. A capacitor comprising an impregnated capacitor section having at least two electrodes, said section being substantially fully encased in a jacket of resinous material, a tubular rivet of the type having a through passageway extending through and being partially embedded in said resinous material, said rivet having an enlarged head mechanically bonded to one electrode, and an external lead wire compressionally bonded to the interior surface of the outwardly projecting end of said tubular rivet and sealing the passageway through the rivet.

2. A capacitor comprising an electrolytic capacitor section having two electrodes, said section being wound about an anode lead wire which extends outwardly from said section, a tab stitched to the cathode electrode of said section, said tab holding the enlarged head of a tubular rivet mechanically and electrically connected to the section, said section being substantially fully encased in a molded resinous shell, an electrolyte impregnant within said capacitor section and retained within said resinous shell, the shank of said rivet extending through said resinous shell and compressionally bonded to an exterior lead wire, said rivet being fully collapsed between said electrolyte and said exterior lead wire so as to prevent corrosion of the latter.

3. A unitary resin-molded electrolytic capacitor comprising an impregnated electrolytic capacitor section having a cathode electrode mechanically affixed to the enlarged head of a tubular rivet, the shank of said tubular rivet extending out from the molded section, and a terminal lead wire compressionally sealed in the outer end of said tubular rivet to preclude the egress of the electrolyte.

4. A method for making a capacitor, which method includes the steps of providing a wound assembly of electrodes and spacer elements with a lead to one electrode extending from one end of the assembly, and a perforated tab extending from a second electrode at one side adjacent the other end, inserting the shank of a tubular rivet through the perforation, folding the rivet-carrying tab over the adjacent end of the assembly to position the enlarged head of the tubular rivet against the other end of the assembly, adherently applying a protective coating over the folded tab to fix it and the rivet in place, molding a resin casing about the assembly as well as the adjacent portions of the lead and the rivet, impregnating the assembly through the tubular passageway in the rivet, then sealing the passageway to prevent leakage of the impregnant.

5. A resin-encased capacitor having a wound assembly of electrodes and spacer elements, a lead for one electrode extending from one end of the assembly, the enlarged head of a tubular rivet being positioned against the other end, a perforated tab connected to a second electrode and folded over the rivet with the rivet shank passing through a tab perforation, a protective coating adherently held around the folded tab, and a resin casing molded around the assembly as well as the adjacent portions of the lead and the rivet.

6. The invention of claim 5 in which the second electrode has its side margin projecting from said other end of the assembly and this margin contacts the rivet head.

References Cited in the file of this patent

UNITED STATES PATENTS

| | | |
|---|---|---|
| 1,726,774 | Sullivan | Sept. 3, 1929 |
| 2,246,933 | Deeley | June 24, 1941 |
| 2,274,327 | Georgiev | Feb. 24, 1942 |
| 2,309,563 | Abeel | Jan. 26, 1943 |
| 2,569,925 | Deeley | Oct. 2, 1951 |
| 2,623,101 | Kurland | Dec. 23, 1952 |
| 2,628,271 | Brafman | Feb. 10, 1953 |